(12) United States Patent
Pey

(10) Patent No.: US 11,518,154 B2
(45) Date of Patent: Dec. 6, 2022

(54) BARRIER FILMS FOR PACKAGING

(71) Applicant: ExxonMobil Chemical Patents Inc., Baytown, TX (US)

(72) Inventor: Chiao-Kiat Pey, Singapore (SG)

(73) Assignee: ExxonMobil Chemical Patents Inc., Baytown, TX (US)

(*) Notice: Subject to any disclaimer, the term of this patent is extended or adjusted under 35 U.S.C. 154(b) by 0 days.

(21) Appl. No.: 17/153,116

(22) Filed: Jan. 20, 2021

(65) Prior Publication Data

US 2021/0229409 A1 Jul. 29, 2021

Related U.S. Application Data

(60) Provisional application No. 62/966,117, filed on Jan. 27, 2020.

(51) Int. Cl.
*B32B 27/32* (2006.01)
*C08L 23/06* (2006.01)
*B32B 27/08* (2006.01)
*B32B 27/20* (2006.01)
*B32B 7/12* (2006.01)

(52) U.S. Cl.
CPC ........... *B32B 27/32* (2013.01); *B32B 7/12* (2013.01); *B32B 27/08* (2013.01); *B32B 27/20* (2013.01); *C08L 23/06* (2013.01); *B32B 2250/242* (2013.01); *B32B 2270/00* (2013.01); *B32B 2307/514* (2013.01); *B32B 2307/7244* (2013.01); *B32B 2553/00* (2013.01)

(58) Field of Classification Search
CPC .. C08L 23/0815; C08L 91/00; C08L 2203/16; C08L 23/06; B32B 2250/05; B32B 2250/24; B32B 2250/242; B32B 2270/00; B32B 2307/3065; B32B 2307/4026; B32B 2307/514; B32B 2307/71; B32B 2307/7244; B32B 2307/732; B32B 2307/746; B32B 2439/70; B32B 2553/00; B32B 27/08; B32B 27/18; B32B 27/20; B32B 27/302; B32B 27/32; B32B 27/327; B32B 27/36; B32B 27/42; B32B 7/12
See application file for complete search history.

(56) References Cited

U.S. PATENT DOCUMENTS

| | | |
|---|---|---|
| 5,569,693 A | 10/1996 | Doshi et al. |
| 5,741,563 A | 4/1998 | Mehta et al. |
| 6,342,566 B2 | 1/2002 | Burkhardt et al. |
| 6,384,142 B1 | 5/2002 | Burkhardt et al. |
| 6,391,411 B1 | 5/2002 | Duckwall, Jr. et al. |
| 6,960,635 B2 | 11/2005 | Stevens et al. |
| 9,956,088 B2 | 5/2018 | Glerum |
| 2001/0046606 A1* | 11/2001 | Tau .................. B32B 27/32 428/213 |
| 2003/0211350 A1 | 11/2003 | Migliorini et al. |
| 2017/0029583 A1 | 2/2017 | Lin et al. |
| 2018/0361722 A1 | 12/2018 | Ambroise et al. |
| 2020/0254737 A1 | 8/2020 | Gillespie et al. |

FOREIGN PATENT DOCUMENTS

| | | |
|---|---|---|
| WO | 1997019991 | 6/1997 |
| WO | 20160135213 | 9/2016 |
| WO | 20170184633 | 10/2017 |

\* cited by examiner

*Primary Examiner* — Lawrence D Ferguson
(74) *Attorney, Agent, or Firm* — ExxonMobil Chemical Patents Inc.—Law Department

(57) ABSTRACT

A laminate film with moderate barrier properties can include: a machine direction oriented (MDO) blown polyethylene substrate laminated to a blown polyethylene sealant film, wherein the blown polyethylene sealant film comprises about 5 wt % to about 25 wt % of hydrocarbon resin. Preferably, a polymeric composition of the laminate film is about 90 wt % to about 100 wt % of polyethylene and hydrocarbon resin cumulatively.

22 Claims, No Drawings

BARRIER FILMS FOR PACKAGING

CROSS-REFERENCE TO RELATED APPLICATION

This application claims the benefit of U.S. Provisional Application No. 62/966,117, filed Jan. 27, 2020, entitled "Barrier Films For Packaging", the entirety of which is incorporated by reference herein.

FIELD

The present disclosure relates to laminate films with moderate barrier properties. Such films can comprise a machine direction oriented (MDO) blown polyethylene substrate to laminated to a blown polyethylene sealant film.

BACKGROUND

The present disclosure relates to altering the barrier properties of polymeric films.

Polymeric films are widely used in many industrial applications. One particularly important application is the packaging industry Films employed in the packaging industry are chosen to provide barrier characteristics necessary. Such barrier characteristics include water vapor barrier, oxygen and gas barrier, as well as flavor and aroma barrier properties.

The packaging industry is often focused on films with high barrier. For example, food packaging preferably uses films with high oxygen barrier properties to mitigate spoilage of the food.

However, there are several industries that require only moderate barrier properties. Films with high barrier qualities are often complex and expensive to manufacture. Further, such films include several layers with different polymeric, metal oxide, or metal compositions. Including several different compositions results in a film that cannot be or is difficult to recycle. Accordingly, there is a need for a film technology that offers moderate, and preferably tailorable, barrier properties that is composed essentially of a polymeric material that is recyclable.

SUMMARY OF THE INVENTION

The present disclosure relates to polymeric films with tailorable, moderate barrier properties whose polymeric composition is composed essentially of polyethylene and hydrocarbon resin.

For example, a laminate film with moderate barrier properties can comprise: a MDO blown polyethylene substrate laminated to a blown polyethylene sealant film, wherein the blown polyethylene sealant film comprises about 5 wt % to about 25 wt % of hydrocarbon resin. Preferably, a polymeric composition of the laminate film comprises about 90 wt % to about 100 wt % of polyethylene and hydrocarbon resin cumulatively; and a polymeric composition of the MDO blown polyethylene substrate comprises about 90 wt % to about 100 wt % polyethylene.

A method can comprise laminating a MDO blown polyethylene substrate laminated to a blown polyethylene sealant film with an adhesive, wherein the blown polyethylene sealant film comprises about 5 wt % to about 25 wt % of hydrocarbon resin. Preferably, a polymeric composition of the laminate film comprises about 90 wt % to about 100 wt % of polyethylene and hydrocarbon resin cumulatively; and a polymeric composition of the MDO blown polyethylene substrate comprises about 90 wt % to about 100 wt % polyethylene.

DETAILED DESCRIPTION

The present disclosure relates to polymeric films with tailorable, moderate barrier properties whose polymeric composition is composed essentially of polyethylene and hydrocarbon resin. Preferably, the hydrocarbon resin is less than 25 wt %, more preferably less than 15 wt %, of the polymeric composition in the polymeric film.

More specifically, the polymeric films of the present disclosure are laminated films comprising a machine direction oriented (MDO) blown polyethylene substrate laminated to a polyethylene sealant film. The polyethylene sealant film includes about 5 wt % to about 25 wt % hydrocarbon resin by weight of the polymeric composition of the polyethylene sealant film. The inclusion of hydrocarbon resin improves the barrier properties of the laminate films to a moderate degree. Such moderate barrier properties may be useful in packing of consumables like bakery items. Further, changing the amount of hydrocarbon resin in the film may be useful in tailoring the barrier properties.

Additionally, the polymeric composition of the laminate film (comprising the MDO polyethylene substrate laminated to the polyethylene sealant) is preferably 90 wt % to 100 wt %, or 95 wt % to 100 wt %, or 99 wt % to 100 wt % of polyethylene and hydrocarbon resin cumulatively, which would increase the recyclability of the laminated film or packaging using the laminate film.

Definitions and Test Methods

As used herein, a "polymer" may be used to refer to homopolymers, copolymers, interpolymers, terpolymers, etc. A "polymer" has two or more of the same or different monomer units. A "homopolymer" is a polymer having monomer units that are the same. A "copolymer" is a polymer having two or more monomer units that are different from each other. A "terpolymer" is a polymer having three monomer units that are different from each other. The term "different" as used to refer to monomer units indicates that the monomer units differ from each other by at least one atom or are different isomerically. Accordingly, the definition of copolymer, as used herein, includes terpolymers and the like. Likewise, the definition of polymer, as used herein, includes copolymers and the like. Thus, as used herein, the terms "polyethylene," "ethylene polymer," "ethylene copolymer," and "ethylene-based polymer" mean a polymer or copolymer comprising at least 50 mol % ethylene units (preferably at least 70 mol % ethylene units, more preferably at least 80 mol % ethylene units, even more preferably at least 90 mol % ethylene units, even more preferably at least 95 mol % ethylene units, or 100 mol % ethylene units (in the case of a homopolymer)).

As used herein, when a polymer is referred to as comprising a monomer, the monomer is present in the polymer in the polymerized form of the monomer or in the derivative to form of the monomer.

As used herein, when a polymer is said to comprise a certain percentage, wt %, of a monomer, that percentage of monomer is based on the total amount of monomer units in the polymer.

Oxygen transmission rate (OTR) is measured according to ASTM D3985-17 at a specified relative humidity and temperature. If these are not specified, the relative humidity is 0% and the temperature is 23° C.

As used herein, Mn is number average molecular weight, Mw is weight average molecular weight, and Mz is z-average molecular weight. Molecular weight distribution, also referred to as polydispersity index (PDI), is defined to be Mw divided by Mn. Unless otherwise noted, all molecular weights (e.g., Mw, Mn, Mz) are reported in units of g/mol.

GPC is a liquid chromatography technique widely used to measure the molecular weight and molecular weight distributions (or polydispersity) of polymers. This is a common and well-known technique. Such characteristics, as described here, have been measured using the broadly practiced techniques.

Unless otherwise indicated, the distribution and the moments of molecular weight (e.g., Mw, Mn, Mz, Mw/Mn) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-μm Teflon filter and degassed with an online degasser before entering the GPC instrument. The nominal flow rate is 1.0 ml/min and the nominal injection volume is 200 μL. The whole system including transfer lines, columns, and detectors are contained in an oven maintained at 145° C. The polymer sample is weighed and sealed in a standard vial with 80-μL flow marker (heptane) added to it. After loading the vial in the autosampler, polymer is automatically dissolved in the instrument with 8 ml added TCB solvent. The polymer is dissolved at 160° C. with continuous shaking for about 1 hour for most polyethylene samples or 2 hours for polypropylene samples. The TCB densities used in concentration calculation are 1.463 g/ml at room temperature and 1.284 g/ml at 145° C. The sample solution concentration is from 0.2 mg/ml to 2.0 mg/ml, with lower concentrations being used for higher molecular weight samples. The concentration (c), at each point in the chromatogram is calculated from the baseline-subtracted IR5 broadband signal intensity (I), using the following equation: $c=\beta I$, where $\beta$ is the mass constant. The mass to recovery is calculated from the ratio of the integrated area of the concentration chromatography over elution volume and the injection mass, which is equal to the pre-determined concentration multiplied by injection loop volume. The conventional molecular weight (IR molecular weight) is determined by combining universal calibration relationship with the column calibration, which is performed with a series of monodispersed polystyrene (PS) standards ranging from 700 g/mol to 10M g/mol. The molecular weight at each elution volume is calculated with (1):

$$\log M = \frac{\log(K_{PS}/K)}{a+1} + \frac{a_{PS}+1}{a+1}\log M_{PS} \qquad \text{EQ. 1}$$

where the variables with subscript "PS" stand for polystyrene while those without a subscript are for the test samples. In this method, $\alpha_{PS}=0.67$ and $K_{PS}=0.000175$ while a and K are for other materials as calculated and published in literature (Sun, T. et al. Macromolecules 2001, 34, 6812), except that for purposes of this invention and claims thereto, $\alpha=0.695$ and $K=0.000579$ for linear ethylene polymers, $\alpha=0.705$ and $K=0.0002288$ for linear propylene polymers, $\alpha=0.695$ and $K=0.000181$ for linear butene polymers, $\alpha$ is 0.695 and K is $0.000579*(1-0.0087*w2b+0.000018*(w2b)^2)$ for ethylene-butene copolymer where w2b is a bulk weight percent of butene comonomer, $\alpha$ is 0.695 and K is $0.000579*(1-0.0075*w2b)$ for ethylene-hexene copolymer where w2b is a bulk weight percent of hexene comonomer, and a is 0.695 and K is $0.000579*(1-0.0077*w2b)$ for ethylene-octene copolymer where w2b is a bulk weight percent of octene comonomer. Concentrations are expressed in $g/cm^3$, molecular weight is expressed in g/mol, and intrinsic viscosity (hence K in the Mark-Houwink equation) is expressed in dL/g unless otherwise noted.

A peak melting point (Tm) can be determined according to ASTM D3418-03 with a 10° C./min heating and cooling rate.

Crystallinity is determined based on ASTM D3418-03 with a 10° C./min heating and cooling rate.

Heat of fusion is determined based on ASTM D3418-03 with a 10° C./min heating and cooling rate.

Crystallization temperature (Tc) is determined based on ASTM D3418-03 with a 10° C./min heating and cooling rate.

A heat deflection temperature is measured based on ASTM D648-18 on injection molded flexure bars at 66 psi load (455 kPa).

A Shore hardness (D scale) is measured based on ASTM D2240-15e1.

A percent amorphous is determined by subtracting the percent crystallinity from 100.

Laminate Films and Applications

The laminate film of the present disclosure comprises a MDO polyethylene substrate laminated to a polyethylene sealant film, wherein the polyethylene sealant film comprises about 5 wt % to about 25 wt %, or about 7 wt % to 23 wt %, or about 10 wt % to about 20 wt % of hydrocarbon resin.

The lamination of the two films can be with an adhesive, which can be a water-based adhesive, a solvent-based adhesive, or a melt adhesive (e.g., a polyethylene melt adhesive).

The thickness of the laminated film can be about 75 microns to about 300 microns, or about 100 microns to about 250 microns, or about 125 microns to about 200 microns. The individual thickness of the MDO polyethylene substrate and the polyethylene sealant film is describe further below.

The laminate film may include additional layers and films. Preferably, such layers would be composed of or consist essentially of polyethylene so that the recyclability is maintained.

The laminate films described herein preferably have an OTR at 0% relative humidity and 23° C. of 50 $cm^3(STP)/(m^2 \cdot day)$ to 500 $cm^3(STP)/(m^2 \cdot day)$, or 100 $cm^3(STP)/(m^2 \cdot day)$ to 400 $cm^3(STP)/(m^2 \cdot day)$, or 200 $cm^3(STP)/(m^2 \cdot day)$ to 350 $cm^3(STP)/(m^2 \cdot day)$. The amount of hydrocarbon resin in the polyethylene sealant film of the laminate film may be used to adjust the OTR of the laminate film, where higher concentrations of hydrocarbon resin may result in lower OTR (higher barrier properties).

Because of the moderate barrier properties, applications for the laminate films described herein can be used in packaging applications for consumable products where smelling the aroma through the packaging would be useful. Such packaging may encompass the entire product or only a portion thereof (e.g., having an aroma permeable window or tab with the remainder of the packaging having higher barrier properties). Examples of products may include, but are not limited to, soap, candles, detergents, fragrant bath salts, and the like. The products can also be foods like baked goods packed in pouches, filled with inert gas like $N_2$ or $CO_2$. In such cases, the food will likely have a longer lifetime because the inert gas can stay longer within the pouches, thereby slowing down the deterioration process.

MDO Blown Polyethylene Substrate

The MDO polyethylene substrate of the laminate films described herein includes about 85 wt % to about 100 wt %, or about 90 wt % to 100 wt %, or about 95 wt % to about 100 wt %, or about 100 wt % polyethylene by weight of the polymeric composition of the MDO to polyethylene substrate. The polyethylene of the MDO polyethylene substrate can be a mixture of two or more polyethylenes.

The MDO polyethylene substrate can be a single layer or multiple layers (e.g., 2 to 10 layers, or 2 to 5 layers, or 2 to 3 layers). In a first example, the MDO polyethylene substrate can be a single layer with a polymeric composition comprising about 85 wt % to about 100 wt % polyethylene.

In another example, the MDO polyethylene substrate can be a two-layer film such that each layer includes a different composition (e.g., different polymeric compositions and/or different additives). For example, a first layer can comprise a first metallocene polyethylene and the second layer can comprise a second metallocene polyethylene or a blend of the first and second metallocene polyethylenes. In another example, the first and second layers can comprise the same polymeric composition with the first layer comprising a slip agent and the second layer comprising the slip agent and an antiblock. In yet another example, the first and second layers can comprise the same polymeric composition but with different concentrations of the same additives in each layer.

In yet another example, the MDO polyethylene substrate can be a three-layer film such that adjacent layers include a different composition. For example, the first and third layers can comprise the same compositions (e.g., 100% metallocene polyethylene optionally with the additives), and the second layer can comprise a different composition (e.g., a blend of two or more polyethylenes optionally with additive), where the second layer is between the first and third layers.

Each layer of the MDO polyethylene substrate can comprise additives. Examples of additives include a slip agent, an antiblock, a filler, an antioxidant, an ultraviolet light stabilizer, a thermal stabilizer, a pigment, a processing aid, a crosslinking catalyst, a flame retardant, and a foaming agent, and the like, and any combination thereof. Preferably, the additives may each individually present in an amount of about 0.01 wt % to about 10 wt %, or about 0.1 wt % to about 5 wt %, or from 0.01 wt % to 1 wt % based on total weight of the layer of the MDO polyethylene substrate.

The thickness of the MDO polyethylene substrate can be about 10 microns to about 75 microns, or about 15 microns to about 50 microns, or about 20 microns to about 40 microns.

When two or more layers are included in the MDO polyethylene substrates, the ratio of the thicknesses between adjacent layers can be about 1:1 to about 1:8, or about 1:1.5 to about 1:6.5, or about 1:2 to about 1:5, where the thicker layer of the adjacent layers is the second value of the ratio.

The MDO polyethylene substrate can be produced by known methods. For example, the composition can be extruded in a molten state through an annular die and then blown and cooled to form a tubular, blown film, which can then be axially slit and unfolded to form a flat film. More specifically, blown films can be prepared as follows. The polymer composition is introduced into the feed hopper of an extruder, such as a 50 mm extruder that is water-cooled, resistance heated, and has an L/D ratio of 30:1. The film can be produced using a 28 cm W&H die with a 1.4 mm die gap, along with a W&H dual air ring and internal bubble cooling. The film is extruded through the die into a film cooled by blowing air onto the surface of the film. The film is drawn from the die typically forming a cylindrical film that is cooled, collapsed and, optionally, subjected to a desired auxiliary process, such as slitting, treating, sealing, or printing. Typical melt temperatures are from about 180° C. to about 230° C. Blown film rates are generally from about 3 to about 25 kilograms per hour per inch (about 4.35 to about 26.11 kilograms per hour per centimeter) of die circumference. The finished film can be wound into rolls for later processing. An illustrative blown film process and apparatus suitable for forming films according to embodiments of the present invention is described in U.S. Pat. No. 5,569,693.

The polyethylenes described herein are also suited for the manufacture of blown film in a high-stalk extrusion process. In this process, a polyethylene melt is fed through a gap (typically 0.5 to 1.6 mm) in an annular die attached to an extruder and forms a tube of molten polymer, which is moved vertically upward. The initial diameter of the molten tube is approximately the same as that of the annular die. Pressurized air is fed to the interior of the tube to maintain a constant air volume inside the bubble. This air pressure results in a rapid 3-to-9-fold increase of the tube diameter, which occurs at a height of approximately 5 to 10 times the die diameter above the exit point of the tube from the die. The increase in the tube diameter is accompanied by a reduction of its wall thickness to a final value ranging from approximately 10 µm to 50 µm and by a development of biaxial orientation in the melt. The expanded molten tube is rapidly cooled (which induces crystallization of the polymer), collapsed between a pair of nip rolls and wound onto a film roll.

In blown film extrusion, the film may be pulled upwards by, for example, pinch rollers after exiting from the die and is simultaneously inflated and stretched transversely sideways to an extent that can be quantified by the blow up ratio (BUR). The inflation provides the transverse direction (TD) stretch, while the upwards pull by the pinch rollers provides a machine direction (MD) stretch. As the polymer cools after exiting the die and inflation, it crystallizes and a point is reached where crystallization in the film is sufficient to prevent to further MD or TD orientation. The location at which further MD or TD orientation stops is generally referred to as the "frost line" because of the development of haze at that location.

Blown Polyethylene Sealant Films

The polyethylene sealant film of the laminate films described herein includes about 5 wt % to about 25 wt %, or about 7 wt % to 23 wt %, or about 10 wt % to about 20 wt % hydrocarbon resin by weight of the polymeric composition of the polyethylene sealant film.

The polyethylene sealant film of the laminate films described herein includes about 75 wt % to about 95 wt %, or about 77 wt % to 93 wt %, or about 80 wt % to about 90 wt % polyethylene by weight of the polymeric composition of the polyethylene sealant film.

The polymeric composition of the polyethylene sealant film can consist of polyethylene and hydrocarbon resin.

The polyethylene sealant film can be a single layer or multiple layers (e.g., 2 to 10 layers, or 2 to 5 layers, or 2 to 3 layers). In a first example, the polyethylene sealant film can be a single layer with a polymeric composition comprising about 5 wt % to about 25 wt % hydrocarbon resin and about 75 wt % to about 95 wt % polyethylene.

In another example, the polyethylene sealant film can be a two-layer film such that each layer includes a different concentration of hydrocarbon resin (exclusive of 0 wt % hydrocarbon resin in one of the layers) such that a polymeric composition of the entire polyethylene sealant film comprises about 5 wt % to about 25 wt % hydrocarbon resin and about 75 wt % to about 95 wt % polyethylene.

In yet another example, the polyethylene sealant film can be a three-layer film such that adjacent layers include different concentrations of hydrocarbon resin (exclusive of 0 wt % hydrocarbon resin in one of the layers) such that a polymeric composition of the entire polyethylene sealant film comprises about 5 wt % to about 25 wt % hydrocarbon resin and about 75 wt % to about 95 wt % polyethylene. In this example, the polyethylene sealant film can include a first layer comprising polyethylene and not comprising hydrocarbon resin, a second layer comprising polyethylene and hydrocarbon resin, and a third layer comprising polyethylene and not comprising hydrocarbon resin, where the second layer is between the first and third layers. Then, the polymeric composition of the entire polyethylene sealant film can comprise about 5 wt % to about 25 wt % hydrocarbon resin and about 75 wt % to about 95 wt % polyethylene.

Each layer of the polyethylene sealant films can further comprise additives. Examples of additives include a slip agent, an antiblock, a filler, an antioxidant, an ultraviolet light stabilizer, a thermal stabilizer, a pigment, a processing aid, a crosslinking catalyst, a flame to retardant, and a foaming agent, and the like, and any combination thereof. Preferably, the additives may each individually present in an amount of about 0.01 wt % to about 10 wt %, or about 0.1 wt % to about 5 wt %, or from 0.01 wt % to 1 wt % based on total weight of the layer of the polyethylene sealant film.

The thickness of the polyethylene sealant film can be about 50 microns to about 290 microns, or about 75 microns to about 250 microns, or about 100 microns to about 150 microns.

When two or more layers are included in the polyethylene sealant film, the ratio of the thicknesses between adjacent layers can be about 1:1 to about 1:4, or about 1:1.5 to about 1:3.5, or about 1:2 to about 1:3, where the thicker layer of the adjacent layers is the second value of the ratio.

The polyethylene sealant film can be produced by known blown film methods including those described herein without the stretching steps that impart orientation in the film.

Polyethylene

The polyethylene used laminate films described herein (e.g., in the MDO polyethylene substrates and the polyethylene sealant films described herein) are selected from ethylene homopolymers, ethylene copolymers, and combinations thereof. Useful copolymers comprise one or more comonomers in addition to ethylene and can be a random copolymer, a statistical copolymer, a block copolymer, and/or compositions thereof. The method of making the polyethylene is not critical, as it can be made by slurry, solution, gas phase, high pressure, or other suitable processes, and by using catalyst systems appropriate for the polymerization of polyethylenes, such as Ziegler-Natta-type catalysts, chromium catalysts, metallocene-type catalysts, other appropriate catalyst systems or combinations thereof, or by free-radical polymerization. In a preferred embodiment, the polyethylenes are made by the catalysts, activators and processes described in U.S. Pat. Nos. 6,342,566; 6,384,142; and 5,741,563; and WO 03/040201 and WO 97/19991. Such catalysts are well known in the art, and are described in, for example, ZIEGLER CATALYSTS (Gerhard Fink, Rolf Mülhaupt and Hans H. Brintzinger, eds., Springer-Verlag 1995); Resconi et al.; and I, II METALLOCENE-BASED POLYOLEFINS (Wiley & Sons 2000).

Polyethylenes that are useful in this invention include those sold by ExxonMobil Chemical Company including high density polyethylene (HDPE), linear low density polyethylene (LLDPE), and low density polyethylene (LDPE); and those sold under the ENABLE™ (ethylene alpha-olefin copolymers), EXACT™ (ethylene alpha-olefin copolymers), EXCEED™ (ethylene alpha-olefin copolymers), EXCEED™ XP (ethylene alpha-olefin copolymers), EXXCO™ (ethylene alpha-olefin copolymers), and PAXON™ (ethylene alpha-olefin copolymers) each available from ExxonMobil Chemical Company.

Preferred ethylene homopolymers and copolymers useful in this invention typically have one or more of the following properties:

1. a Mw of 20,000 g/mol or more, 20,000 g/mol to 2,000,000 g/mol, preferably 30,000 g/mol to 1,000,000 g/mol, preferably 40,000 g/mol to 200,000 g/mol, preferably 50,000 g/mol to 750,000 g/mol, as determined by the method described herein; and/or
2. a Tm of 30° C. to 150° C., preferably 30° C. to 140° C., preferably 50° C. to 140° C., more preferably 60° C. to 135° C.; and/or
3. a crystallinity of 5% to 80%, preferably 10% to 70%, more preferably 20% to 60%, preferably at least 30%, or at least 40%, or at least 50%, as determined based on ASTM D3418-03 with a heating/cooling rate of 10° C./min; and/or
4. a heat of fusion of 300 J/g or less, preferably 1 J/g to 260 J/g, preferably 5 J/g to 240 J/g, preferably 10 J/g to 200 J/g, as determined based on ASTM D3418-03 with a heating/cooling rate of 10° C./min; and/or
5. a crystallization temperature (Tc) of 15° C. to 130° C., preferably 20° C. to 120° C., more preferably 25° C. to 110° C., preferably 60° C. to 125° C., as determined based on ASTM D3418-03 with a heating/cooling rate of 10° C./min; and/or
6. a heat deflection temperature of 30° C. to 120° C., preferably 40° C. to 100° C., more preferably 50° C. to 80° C. as measured based on ASTM D648-18 on injection molded flexure bars, at 66 psi load (455 kPa); and/or
7. a Shore hardness (D scale) of 10 or more, preferably 20 or more, preferably 30 or more, preferably 40 or more, preferably 100 or less, preferably from 25 to 75 (as measured based on ASTM D2240-15e1); and/or
8. a percent amorphous content of at least 50%, preferably at least 60%, preferably at least 70%, more preferably between 50% and 95%, or 70% or less, preferably 60% or less, preferably 50% or less as determined by subtracting the percent crystallinity from 100.

The polyethylene may be an ethylene homopolymer, such as HDPE. In one embodiment, the ethylene homopolymer has a molecular weight distribution (Mw/Mn) or (MWD) of up to 40, preferably ranging from 1.5 to 20, or from 1.8 to 10, or from 1.9 to 5, or from 2.0 to 4. In another embodiment, the 1% secant flexural modulus (determined based on ASTM D790A, where test specimen geometry is as specified under the ASTM D790-17 section "Molding Materials (Thermoplastics and Thermosets)," and the support span is 2 inches (5.08 cm)) of the polyethylene falls in a range of 200 MPa to 1000 MPa, and from 300 MPa to 800 MPa in another embodiment, and from 400 MPa to 750 MPa in yet another embodiment, wherein a desirable polymer may exhibit any combination of any upper flexural modulus limit with any lower flexural modulus limit. The MI of preferred ethylene homopolymers range from 0.05 dg/min to 800 dg/min in one embodiment, and from 0.1 dg/min to 100 dg/min in another embodiment, as measured based on ASTM D1238-13 (190° C., 2.16 kg).

In a preferred embodiment, the polyethylene comprises less than 20 mol % propylene units (preferably less than 15 mol %, preferably less than 10 mol %, preferably less than 5 mol %, and preferably 0 mol % propylene units).

In another embodiment of the invention, the polyethylene useful herein is produced by polymerization of ethylene and, optionally, an alpha-olefin with a catalyst having, as a transition metal component, a bis (n-C34 alkyl cyclopentadienyl) hafnium compound, wherein the transition metal component preferably comprises from 95 mol % to about 99 mol % of the hafnium compound as further described in U.S. Pat. No. 9,956,088.

In another embodiment of the invention, the polyethylene is an ethylene copolymer, either random or block, of ethylene and one or more comonomers selected from C3 to C20 α-olefins, typically from C3 to C10 α-olefins. Preferably, the comonomers are present from 0.1 wt % to 50 wt % of the copolymer in one embodiment, and from 0.5 wt % to 30 wt % in another embodiment, and from 1 wt % to 15 wt % in yet another embodiment, and from 0.1 wt % to 5 wt % in yet another embodiment, wherein a desirable copolymer comprises ethylene and C3 to C20 α-olefin derived units in any combination of any upper wt % limit with any lower wt % limit described herein. Preferably, the ethylene copolymer will have a weight average molecular weight of from greater than 8,000 g/mol in one embodiment, and greater than 10,000 g/mol in another embodiment, and greater than 12,000 g/mol in yet another embodiment, and greater than 20,000 g/mol in yet another embodiment, and less than 1,000,000 g/mol in yet another embodiment, and less than 800,000 g/mol in yet another embodiment, wherein a desirable copolymer may comprise any upper molecular weight limit with any lower molecular weight limit described herein.

In another embodiment, the ethylene copolymer comprises ethylene and one or more other monomers selected from the group consisting of C3 to C20 linear, branched or cyclic monomers, and in some embodiments is a C3 to C12 linear or branched alpha-olefin, preferably butene, pentene, hexene, heptene, octene, nonene, decene, dodecene, 4-methyl-pentene-1,3-methyl pentene-1,3,5,5-trimethyl-hexene-1, and the like. The monomers may be present at up to 50 wt %, preferably from up to 40 wt %, more preferably from 0.5 wt % to 30 wt %, more preferably from 2 wt % to 30 wt %, more preferably from 5 wt % to 20 wt %, based to on the total weight of the ethylene copolymer.

Preferred linear alpha-olefins useful as comonomers for the ethylene copolymers useful in this invention include C3 to C8 alpha-olefins, more preferably 1-butene, 1-hexene, and 1-octene, even more preferably 1-hexene. Preferred branched alpha-olefins include 4-methyl-1-pentene, 3-methyl-1-pentene, 3,5,5-trimethyl-1-hexene, and 5-ethyl-1-nonene. Preferred aromatic-group-containing monomers contain up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to C1 to C10 alkyl groups. Additionally, two adjacent substitutions may be joined to form a ring structure. Preferred aromatic-group-containing monomers contain at least one aromatic structure appended to a polymerizable olefinic moiety. Particularly, preferred aromatic monomers include styrene, alpha-methylstyrene, para-alkyl-styrenes, vinyltoluenes, vinylnaphthalene, allyl benzene, and indene, especially styrene, paramethyl styrene, 4-phenyl-1-butene and allyl benzene.

Preferred diolefin monomers useful in this invention include any hydrocarbon structure, preferably C4 to C30, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene, or higher ring containing diolefins with or without substituents at various ring positions.

In a preferred embodiment, one or more dienes are present in the polyethylene at to up to 10 wt %, preferably at 0.00001 wt % to 2 wt %, preferably 0.002 wt % to 1 wt %, even more preferably 0.003 wt % to 0.5 wt %, based upon the total weight of the polyethylene. In some embodiments, diene is added to the polymerization in an amount of from an upper limit of 500 ppm, 400 ppm, or 300 ppm to a lower limit of 50 ppm, 100 ppm, or 150 ppm.

Preferred ethylene copolymers useful herein are preferably a copolymer comprising at least 50 wt % ethylene and having up to 50 wt %, preferably 1 wt % to 35 wt %, even more preferably 1 wt % to 6 wt % of a C3 to C20 comonomer, preferably a C4 to C8 comonomer, preferably, hexene or octene based upon the weight of the copolymer. Preferably, these polymers are metallocene polyethylenes (mPEs).

Useful mPE homopolymers or copolymers may be produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted. Several commercial products produced with such catalyst/activator combinations are commercially available from ExxonMobil Chemical Company under the tradename EXCEED™ or ENABLE™ Hydrocarbon Resin The polyethylene sealant film of the laminate films described herein includes about 5 wt % to about 25 wt %, or about 7 wt % to 23 wt %, or about 10 wt % to about 20 wt % hydrocarbon resin by weight of the polymeric composition of the polyethylene sealant film.

Suitable hydrocarbon resins include, but are not limited to, aliphatic hydrocarbon resins, at least partially hydrogenated aliphatic hydrocarbon resins, aliphatic/aromatic hydrocarbon resins, at least partially hydrogenated aliphatic aromatic hydrocarbon resins, aromatic resins, at least partially hydrogenated aromatic hydrocarbon resins, cycloaliphatic hydrocarbon resins, at least partially hydrogenated cycloaliphatic resins, cycloaliphatic/aromatic hydrocarbon resins, cycloaliphatic/aromatic at least partially hydrogenated hydrocarbon resins, polyterpene resins, terpene-phenol resins, rosin esters, rosin acids, grafted resins, and mixtures of two or more of the foregoing. The hydrocarbon resins may be polar or apolar.

Suitable hydrocarbon resins may be one or more hydrocarbon resins produced by the thermal polymerization of cyclopentadiene (CPD) or substituted CPD, which may further include aliphatic or aromatic monomers as described later. The hydrocarbon resin may be a non-aromatic resin or an aromatic resin. The hydrocarbon resin may have an aromatic content between 0 wt % and 60 wt %, or between 1 wt % and 60 wt %, or between 1 wt % and 40 wt %, to or between 1 wt % and 20 wt %, or between 10 wt % and 20 wt %. Alternatively or additionally, the hydrocarbon resin may have an aromatic content between 15 wt % and 20 wt %, or between 1 wt % and 10 wt %, or between 5 wt % and 10 wt %. Preferred aromatics that may be in the hydrocarbon resin include one or more of styrene, indene, derivatives of styrene, and derivatives of indene. Particularly preferred aromatic olefins include styrene, alpha-methylstyrene, beta-methylstyrene, indene, and methylindenes, and vinyl toluenes. Styrenic components include styrene, derivatives of styrene, and substituted sytrenes. In general, styrenic components do not include fused-rings, such as indenics.

Suitable hydrocarbon resins may be produced by the catalytic (cationic) polymerization of linear dienes. Such monomers are primarily derived from Steam Cracked Naphtha (SCN) and include C5 dienes such as piperylene (also known as 1,3-pentadiene). Polymerizable aromatic monomers can also be used to produce resins and may be relatively pure, e.g., styrene, -methyl styrene, or from a C9-aromatic SCN stream. Such aromatic monomers can be used alone or in combination with the linear dienes previously described. "Natural" monomers can also be used to produce resins, e.g., terpenes such as alpha-pinene or beta-carene, either used alone or in high or low concentrations with other polymerizable monomers. Typical catalysts used to make these resins are AlCl3 and BF3, either alone or complexed. Mono-olefin modifiers such as 2-methyl, 2-butene may also be used to control the molecular weight distribution (MWD) of the final resin. The final resin may be partially or totally hydrogenated.

Suitable hydrocarbon resins may be at least partially hydrogenated or substantially hydrogenated. As used herein, "at least partially hydrogenated" means that the material contains less than 90% olefinic protons, or less than 75% olefinic protons, or less than 50% olefinic protons, or less than 40% olefinic protons, or less than 25% olefinic protons, such as from 20% to 50% olefinic protons. As used herein, "substantially hydrogenated" means that the material contains less than 5% olefinic protons, or less than 4% olefinic protons, or less than 3% olefinic protons, or less than 2% olefinic protons, such as from 1% to 5% olefinic protons. The degree of hydrogenation is typically conducted so as to minimize and avoid hydrogenation of the aromatic bonds.

Suitable hydrocarbon resins may comprise one or more oligomers such as dimers, trimers, tetramers, pentamers, and hexamers. The oligomers may be derived from a petroleum distillate boiling in the range of 30° C. to 210° C. The oligomers may be derived from any suitable process and are often derived as a byproduct of resin polymerization. Suitable oligomer streams may have number average molecular weights (Mn) between 130 and 500, or between to 130 and 410, or between 130 and 350, or between 130 and 270, or between 200 and 350, or between 200 and 320. Examples of suitable oligomer streams include, but are not limited to, oligomers of cyclopentadiene and substituted cyclopentadiene, oligomers of C4-C6 conjugated diolefins, oligomers of C8-C10 aromatic olefins, and combinations thereof. Other monomers may be present. These include C4-C6 mono-olefins and terpenes. The oligomers may comprise one or more aromatic monomers and may be at least partially hydrogenated or substantially hydrogenated.

Preferably, suitable hydrocarbon resins have a dicyclopentadiene, cyclopentadiene, and methylcyclopentadiene derived content of about 60 wt % to about 100 wt % of the total weight of the hydrocarbon resin. In any embodiment, suitable hydrocarbon may have a dicyclopentadiene, cyclopentadiene, and methylcyclopentadiene derived content of about 70 wt % to about 95 wt %, or about 80 wt % to about 90 wt %, or about 95 wt % to about 99 wt % of the total weight of the hydrocarbon resin. Preferably, the hydrocarbon resin includes, in predominant part, dicyclopentadiene derived units. The term "dicyclopentadiene derived units", "dicyclopentadiene derived content", and the like refers to the dicyclopentadiene monomer used to form the polymer, i.e., the unreacted chemical compound in the form prior to polymerization, and can also refer to the monomer after it has been incorporated into the polymer, which by virtue of the polymerization reaction typically has fewer hydrogen atoms than it does prior to the polymerization reaction.

In any embodiment, suitable hydrocarbon resins may have a dicyclopentadiene derived content of about 50 wt % to about 100 wt % of the total weight of the hydrocarbon resin, more preferably about 60 wt % to about 100 wt % of the total weight of the hydrocarbon resin, even more preferably about 70 wt % to about 100 wt % of the total weight of the hydrocarbon resin. Accordingly, in any embodiment, suitable hydrocarbon resins may have a dicyclopentadiene derived content of about 50% or more, or about 60% or more, or about 70% or more, or about 75% or more, or about 90% or more, or about 95% or more, or about 99% or more of the total weight of the hydrocarbon resin.

Suitable hydrocarbon resins may include up to 5 wt % indenic components, or up to 10 wt % indenic components. Indenic components include indene and derivatives of indene. Often, the hydrocarbon resin includes up to 15 wt % indenic components. Alternatively, the hydrocarbon resin is substantially free of indenic components.

Preferred hydrocarbon resins have a melt viscosity of from 300 to 800 centipoise (cPs) at 160° C., or more preferably of from 350 cPs to 650 cPs at 160° C. Preferably, the melt viscosity of the hydrocarbon resin is from 375 cPs to 615 cPs at 160° C., or from 475 cPs to 600 cPs at 160° C. The melt viscosity may be measured by a Brookfield viscometer with a type "J" spindle according to ASTM D6267/D6267M-13(2017).

Suitable hydrocarbon resins have a Mw greater than about 600 g/mol or greater than about 1000 g/mol. The hydrocarbon resin may have a Mw of from about 600 g/mol to about 1400 g/mol, or from about 800 g/mol to about 1200 g/mol. Preferred hydrocarbon resins have a weight average molecular weight of from about 800 g/mol to about 1000 g/mol. Suitable hydrocarbon resins may have a Mn of from about 300 g/mol to about 800 g/mol, or from about 400 g/mol to about 700 g/mol, or more preferably from about 500 g/mol to about 600 g/mol. Suitable hydrocarbon resins may have an Mz of from about 1250 g/mol to about 3000 g/mol, or more preferably from about 1500 g/mol to about 2500 g/mol. Mw, Mn, and Mz may be determined by gel permeation chromatography (GPC). In any embodiment, suitable hydrocarbon resins may have a polydispersion index ("PDI", PDI=Mw/Mn) of 4 or less, preferably from 1.3 to 1.7.

Preferred hydrocarbon resins have a glass transition temperature (Tg) of from about 30° C. to about 200° C., or from about 0° C. to about 150° C., or from about 50° C. to about 160° C., or from about 50° C. to about 150° C., or from about 50° C. to about 140° C., or from about 80° C. to about 100° C., or from about 85° C. to about 95° C., or from about 40° C. to about 60° C., or from about 45° C. to about 65° C. Preferably, suitable hydrocarbon resins have a Tg from about 60° C. to about 90° C. Differential scanning calorimetry (DSC) is used to determine glass transition temperature.

Specific examples of commercially available hydrocarbon resins include OPPERA™ PR 100, 100A, 101, 102, 103, 104, 105, 106, 111, 112, 115, and 120 materials, and OPPERA™ PR 131 hydrocarbon resins all available from ExxonMobil Chemical Company; ARKON™ M90, M100, M115 and M135 and SUPER ESTER™ rosin esters available from Arakawa Chemical Company; SYLVARES™ phenol modified styrene- and methyl styrene resins, styrenated terpene resins, ZONATAC™ terpene-aromatic resins, and terpene phenolic resins available from Arizona Chemical Company; SYLVATAC™ and SYLVALITE™ rosin esters available from Arizona Chemical Company; NORSOLENE™ aliphatic aromatic resins available from Cray Valley; DERTOPHENE™ terpene phenolic resins available from DRT Chemical Company; EASTOTAC™ resins, PICCOTACT™ C5/C9 resins, REGALITE™ and REGALREZ™ aromatic and REGALITE™ cycloaliphatic/aromatic resins available from Eastman Chemical Company; WINGTACK™ ET™ and EXTRA™ available from Goodyear Chemical Company; FORAL™, PENTALYN™, AND PERMALYN™ rosins and rosin esters available from Hercules (now Eastman Chemical Company); QUINTONE™ acid modified C5 resins, C5/C9 resins, and acid modified C5/C9 resins available from Nippon Zeon; LX™ mixed aromatic/cycloaliphatic resins available from Neville Chemical Company; and CLEARON™ hydrogenated terpene aromatic resins available from Yasuhara. The preceding examples are illustrative only and by no means limiting.

These commercial compounds generally have a Ring and Ball softening point (measured according to ASTM E-28 (Revision 1996)) of about 10° C. to about 200° C., more preferably about 50° C. to about 180° C., more preferably about 80° C. to about 175° C., more preferably about 100° C. to about 160° C., more preferably about 110° C. to about 150° C., and more preferably about 125° C. to about 140° C., wherein any upper limit and any lower limit of softening point may be combined for a preferred softening point range. For hydrocarbon resins a convenient measure is the ring and ball softening point determined according to ASTM E-28.

Example Embodiments

A first example embodiment is a laminate film comprising: a MDO blown polyethylene substrate laminated to a blown polyethylene sealant film, wherein the blown polyethylene sealant film comprises about 5 wt % to about 25 wt % of hydrocarbon resin.

A second example embodiment is a method comprising laminating a MDO blown polyethylene substrate laminated to a blown polyethylene sealant film with an adhesive, wherein the blown polyethylene sealant film comprises about 5 wt % to about 25 wt % of hydrocarbon resin.

Either example embodiment can include one or more of the following: Element 1: wherein a polymeric composition of the laminate film comprises about 90 wt % to about 100 wt % of polyethylene and hydrocarbon resin cumulatively; Element 2: wherein a polymeric composition of the laminate film comprises about 95 wt % to about 100 wt % of polyethylene and hydrocarbon resin cumulatively; Element 3: wherein the blown polyethylene sealant film has two or more layers; Element 4: Element 3 and wherein the blown polyethylene sealant film comprises a core layer between two skin layers; Element 5: Element 4 and wherein the hydrocarbon resin resides in the core layer; Element 6: wherein the MDO blown polyethylene substrate has two or more layers; Element 7: Element 6 and wherein the MDO blown polyethylene substrate comprises a core layer between two skin layers; Element 8: wherein a polymeric composition of the MDO blown polyethylene substrate comprises about 90 wt % to about 100 wt % polyethylene; Element 9: wherein a thickness of the laminate film is about 75 microns to about 300 microns, and a thickness of the MDO blown polyethylene substrate is to about 10 microns to about 75 microns; Element 10: wherein the blown polyethylene sealant film further comprises an additive selected from the group consisting of slip agent, an antiblock, a filler, an antioxidant, an ultraviolet light stabilizer, a thermal stabilizer, a pigment, a processing aid, a crosslinking catalyst, a flame retardant, and a foaming agent, and any combination thereof; Element 11: wherein the MDO blown polyethylene substrate further comprises an additive selected from the group consisting of slip agent, an antiblock, a filler, an antioxidant, an ultraviolet light stabilizer, a thermal stabilizer, a pigment, a processing aid, a crosslinking catalyst, a flame retardant, and a foaming agent, and any combination thereof; Element 12: wherein the hydrocarbon resin is selected from the group consisting of aliphatic hydrocarbon resins, at least partially hydrogenated aliphatic hydrocarbon resins, aliphatic/aromatic hydrocarbon resins, at least partially hydrogenated aliphatic aromatic hydrocarbon resins, aromatic resins, at least partially hydrogenated aromatic hydrocarbon resins, cycloaliphatic hydrocarbon resins, at least partially hydrogenated cycloaliphatic resins, cycloaliphatic/aromatic hydrocarbon resins, cycloaliphatic/aromatic at least partially hydrogenated hydrocarbon resins, polyterpene resins, terpene-phenol resins, rosin esters, rosin acids, grafted resins, and mixtures of two or more of the foregoing; Element 13: wherein the hydrocarbon resin has a melt viscosity of from 300 to 800 centipoise (cPs) at 160° C.; Element 14: wherein the hydrocarbon resin has a molecular weight according to one or more selected from the group consisting of: a Mw of from about 600 g/mol to about 1400 g/mol, a Mn of from about 300 g/mol to about 800 g/mol, and a Mz of from about 1250 g/mol to about 3000 g/mol; Element 15: wherein the hydrocarbon resin has a Tg of from about 30° C. to about 200° C.; Element 16: wherein the hydrocarbon resin is a cycloaliphatic hydrocarbon resin having a Ring and Ball softening point of about 10° C. to about 200° C.; and Element 17: wherein the hydrocarbon resin is a cycloaliphatic hydrocarbon resin having a Ring and Ball softening point of about 110° C. to about 150° C. Examples of combinations include, but are not limited to, Element 1 or 2 in combination with one or more of Elements 3-17; Element 3 (and optionally Element 4 or Elements 4 and 5) in combination with Element 6 (and optionally Element 7) and optionally in further combination with one or more of Elements 8-17 in combination; Element 3 (and optionally Element 4 or Elements 4 and 5) in combination with one or more of Elements 8-17 in combination; Element 6 (and optionally Element 7) in combination with one or more of Elements 8-17 in combination; and two or more of Elements 8-17 in combination.

Unless otherwise indicated, all numbers expressing quantities of ingredients, properties such as molecular weight, reaction conditions, and so forth used in the present specification and associated claims are to be understood as being modified in all instances by to the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

One inventive film and two comparative films were prepared and the oxygen barrier properties tested.

The first Comparative Film (CF1) was prepared by laminating a 15-micron thick polyamide substrate to a 145-micron thick polyethylene sealant film using a solventless type (a solvent-based adhesive would also be applicable). The polyethylene sealant film included: outer skin being a blend of 75 wt % EXCEED™ 2018 KB and 25 wt % ENABLE™ 20-05HH; core being a blend of 90 wt % ENABLE™ 35-05HH and 10 wt % white masterbatch (comprising polyethylene and white colorant); and inner skin being a blend of 75 wt % EXCEED™ 2018 KB and 25 wt % ENABLE™ 20-05HH. The thickness ratios of the layers of the polyethylene sealant film were 1:2:1 of outer skin to core to inner skin. The average thickness of CF1 was 158 microns.

The second Comparative Film (CF2) was prepared by laminating a 25-micron thick MDO polyethylene substrate to a 135-micron thick blown polyethylene sealant film using a solventless adhesive. The MDO substrate was first blown with the layers of: outer skin being 100 wt % ENABLE™ 40-02HH; core being a blend of 40 wt % ENABLE™ 40-02HH, 30 wt % EXCEED™ XP 8656MK, and 30 wt % EXXONMOBIL™ HDPE HTA108; and inner skin being 100 wt % ENABLE™ 40-02HH. The thickness ratios of the layers of the blown film were 1:4:1 of outer skin to core to inner skin. The blown film was subjected to additional machine direction orientation. The polyethylene sealant film included: outer skin being a blend of 65 wt % ENABLE™ 35-05HH and 35 wt % ENABLE™ 20-05HH; core being a blend of 40 wt % ENABLE™ 35-05HH, 50 wt % EXXONMOBIL™ HDPE HTA108, and 10 wt % white masterbatch; and inner skin being a blend of 40 wt % EXCEED™ 1012 MK, 20 wt % ENABLE™ 20-05HH, and 40 wt % AFFINITY™ 1881G. The thickness ratios of the layers of the polyethylene sealant film were 1:2:1 of outer skin to core to inner skin. The average thickness of CF2 was 169 microns.

The Inventive Film (IF1) was prepared by laminating a 25-micron thick MDO polyethylene substrate to a 135-micron thick blown polyethylene sealant film using a solventless adhesive. The MDO substrate film was first blown with the layers of: outer skin being 100 wt % ENABLE™ 40-02HH; core being a blend of 40 wt % ENABLE™ 40-02HH, 30 wt % EXCEED XP™ 8656MK, and 30 wt % EXXONMOBIL™ HDPE HTA108; and inner skin being 100 wt % ENABLE™ 40-02HH. The thickness ratios of the layers of the blown film were 1:4:1 of outer skin to core to inner skin. The blown film was then oriented in the machine direction. The polyethylene sealant film included: outer skin being a blend of 65 wt % ENABLE™ 35-05HH and 35 wt % ENABLE™ 20-05HH; core being a blend of 40 wt % ENABLE™ 35-05HH, 30 wt % EXXONMOBIL™ HDPE HTA108, 10 wt % white masterbatch, and 20 wt % OPPERA™ masterbatch (50 wt % OPPERA™ PR100 in EXXONMOBIL™ HDPE HTA108); and inner skin being a blend of 40 wt % EXCEED™ 1012 MK, 20 wt % ENABLE™ 20-05HH, and 40 wt % AFFINITY™ 1881G. The thickness ratios of the layers of the polyethylene sealant film were 1:2:1 of outer skin to core to inner skin. The average thickness of IF1 was 166 microns.

The oxygen transmission rates for the films were tested at 0% relative humidity and 23° C. (ASTM D3985-17) and are presented in Table 1.

TABLE 1

| Sample | OTR (cm$^3$(STP)/(m$^2$ · day) |
|---|---|
| CF1 | 34 |
| CF2 | 521 |
| IF1 | 308* |

*The OTR for IF1 was measured twice and an average is presented here.

This example illustrates that the inclusion of a hydrocarbon resin can moderately reduce the barrier properties of a laminate film. Further, by adjusting the concentration of hydrocarbon resin in the polyethylene sealant film of the laminate film it is believed that the barrier properties can be tailored.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A laminate film comprising:
a machine direction oriented (MDO) blown polyethylene substrate laminated to a blown polyethylene sealant film, wherein:
the MDO blown polyethylene substrate comprises about 85 wt % to 100 wt % of one or more polyethylenes;
the blown polyethylene sealant film comprises about 75 wt % to about 95 wt % of polyethylene and about 5 wt % to about 25 wt % of hydrocarbon resin.

2. The film of claim 1, wherein the hydrocarbon resin is a cycloaliphatic hydrocarbon resin having a Ring and Ball softening point of about 110° C. to about 150° C.

3. The film of claim 1, wherein the hydrocarbon resin has a Mw of from about 600 g/mol to about 1400 g/mol.

4. The film of claim 1, wherein a polymeric composition of the laminate film comprises about 90 wt % to about 100 wt % of polyethylene and hydrocarbon resin cumulatively.

5. The film of claim 1, whereinthe blown polyethylene sealant film has two or more layers.

6. The film of claim 5, wherein the blown polyethylene sealant film comprises a core layer between two skin layers.

7. The film of claim 6, wherein the hydrocarbon resin resides in the core layer.

8. The film of claim 1, wherein the MDO blown polyethylene substrate has two or more layers.

9. The film of claim 8, wherein the MDO blown polyethylene substrate comprises a core layer between two skin layers.

10. The film of claim 1, wherein a polymeric composition of the MDO blown polyethylene substrate comprises about 90 wt % to about 100 wt % polyethylene.

11. The film of claim 1, wherein a thickness of the laminate film is about 75 microns to about 300 microns, and a thickness of the MDO blown polyethylene substrate is about 10 microns to about 75 microns.

12. The film of claim 1, wherein the blown polyethylene sealant film further comprises an additive selected from the group consisting of slip agent, an antiblock, a filler, an antioxidant, an ultraviolet light stabilizer, a thermal stabilizer, a pigment, a processing aid, a crosslinking catalyst, a flame retardant, and a foaming agent, and any combination thereof.

13. The film of claim 1, wherein the MDO blown polyethylene substrate further comprises an additive selected from the group consisting of slip agent, an antiblock, a filler, an antioxidant, an ultraviolet light stabilizer, a thermal stabilizer, a pigment, a processing aid, a crosslinking catalyst, a flame retardant, and a foaming agent, and any combination thereof.

14. A method comprising:
laminating a machine direction oriented (MDO) blown polyethylene substrate laminated to a blown polyethylene sealant film with an adhesive, wherein:
the MDO blown polyethylene substrate comprises about 85 wt % to 100 wt % of one or more polyethylenes;
the blown polyethylene sealant film comprises about 75 wt % to about 95 wt % of polyethylene and about 5 wt % to about 25 wt % of hydrocarbon resin.

15. The method of claim 14, wherein the hydrocarbon resin is a cycloaliphatic hydrocarbon resin having a Ring and Ball softening point of about 110° C. to about 150° C.; and/or wherein the hydrocarbon resin has a Mw of from about 600 g/mol to about 1400 g/mol.

16. The method of claim 14, wherein a polymeric composition of the laminate film comprises about 90 wt % to about 100 wt % of polyethylene and hydrocarbon resin cumulatively.

17. The method of claim 14, wherein the blown polyethylene sealant film has two or more layers.

18. The method of claim 17, wherein the blown polyethylene sealant film comprises a core layer between two skin layers, and furthermore wherein the hydrocarbon resin resides in the core layer.

19. The method of claim 14, wherein the MDO blown polyethylene substrate has two or more layers.

20. The method of claim 19, wherein the MDO blown polyethylene substrate comprises a core layer between two skin layers.

21. The method of claim 14, wherein a polymeric composition of the MDO blown polyethylene substrate film comprises about 90 wt % to about 100 wt % polyethylene.

22. The method of claim 14, wherein a thickness of the laminate film is about 75 microns to about 300 microns, and a thickness of the MDO blown polyethylene substrate is about 10 microns to about 75 microns.

* * * * *